United States Patent [19]
Fixler et al.

[11] 3,743,947
[45] July 3, 1973

[54] RELATIVE AMPLITUDE SEPARATION DETECTION GATE

[75] Inventors: Jon S. Fixler, Philadelphia, Pa.;
Leonard Feldman, Great Neck, N.Y.

[73] Assignee: Industrial Patent Development Corporation, Philadelphia, Pa.

[22] Filed: Jan. 10, 1972

[21] Appl. No.: 216,516

[52] U.S. Cl. ............. 328/117, 235/185, 307/235 R, 328/94, 328/148, 328/156, 328/158
[51] Int. Cl. ............................ G06g 7/14, H03k 5/20
[58] Field of Search ................... 307/235, 236, 243, 307/218, 215; 328/94, 116, 117, 146, 148, 150, 156, 158, 159; 235/185, 193

[56] References Cited
UNITED STATES PATENTS

| | | |
|---|---|---|
| 3,466,552 | 9/1969 | Sels .................................. 307/235 X |
| 3,600,688 | 8/1971 | Booth ............................. 328/117 X |
| 2,846,574 | 8/1958 | Schroeder ....................... 328/156 X |
| 2,892,884 | 6/1959 | Gibson ............................ 328/158 X |

OTHER PUBLICATIONS

Millman & Taub, Pulse, Digital and Switching Waveforms; p. 317-319, McGraw-Hill Book Co., 1965.

Primary Examiner—John W. Huckert
Assistant Examiner—L. N. Anagnos
Attorney—Arthur H. Seidel et al.

[57] ABSTRACT

A relative amplitude separation detection gate in which a relative amplitude difference between signals may be detected. The gate or system inverts one of the signals. The inverted signal and the other signal are matrixed in predetermined relative amounts. A logic gate is then used to detect a predetermined polarity relationship between one of the input signals and the output of the matrix.

8 Claims, 2 Drawing Figures

PATENTED JUL 3 1973    3,743,947

RELATIVE AMPLITUDE SEPARATION DETECTION GATE

The present invention relates to a relative amplitude separation detection gate. More particularly, the present invention relates to a gate or circuitry for detecting a predetermined relative amplitude relationship between two input signals. For example, assuming the input resistance of the two channels is the same, a 6 decibel (db) difference may be detected between the input signals by detecting a two to one voltage ratio or relative amplitude relationship.

The present invention may be used in detecting amplitude separation or separation between input signals in a stereo system. In response to the detection of the amplitude separation between these signals, certain other gates may be gated on to gate the stereo output to particular speakers in response to the detection of instantaneous separation between the input signals.

The present invention may also be used in numerous other applications. For example, a plurality of separate and distinct information signals may be sent along a telephone line or other line pair with the detection or separation of these signals being accomplished by use of the present invention. Similarly, circuits in accordance with the present invention may be used in direction finding equipment to detect an instantaneous amplitude difference between a pair of input signals in order to obtain an indication of the direction of the incoming signal. That is, in a direction finding system, a plurality of antennas would be used. The instantaneous amplitude relationship between the incoming signals on the various antennas would be detected by means of the present invention. From this relative instantaneous amplitude relationship, it is possible to produce an indication of the direction of the incoming signal. It will be apparent to those skilled in the art that numerous other similar uses may be made of the present invention.

In accordance with the present invention, one of a pair of input signals is inverted by an inverting means. The inverted signal and the other of the pair of input signals is matrixed in a matrixing means in which the signals are algebraically combined in accordance with a predetermined relative amplitude relationship. That is, they are combined in a predetermined ratio, for example, 2:1. The output of the matrix means and one of the inputs is applied to a gating means which detects a predetermined polarity relationship between these two signals.

For the purpose of illustrating the invention, there are shown in the drawings forms which are presently preferred; it being understood, however, that this invention is not limited to the precise arrangements and instrumentalities shown.

Figure 1:
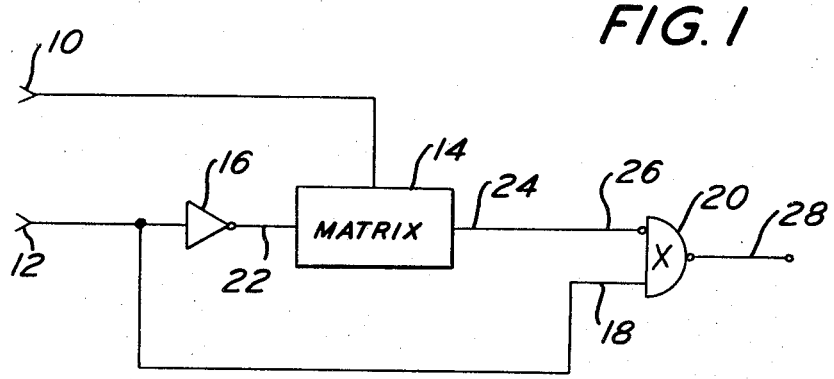
FIG. 1 is a schematic diagram, partially in block diagram form, of an apparatus in accordance with the present invention.

Referring now to the drawings in detail, wherein like numerals indicate like elements, there is shown in FIG. 1 an input terminal 10 and an input terminal 12. A signal applied to input terminal 10 is applied to matrix 14. A signal applied to input terminal 12 is applied to inverter means 16 and to input 18 of AND gate 20. The output of inverter means 16 is applied to input 22 of matrix 14. The signal applied to input terminal 10 is matrixed with a predetermined amplitude of the output signal of inverter means 16 to produce an output on terminal 24 corresponding to the algebraic sum of the signal on input terminal 10 and inverted signal output of inverter means 16 multiplied by a predetermined number. Output 24 of matrix 14 is applied to inverting input terminal 26 of AND gate 20. Therefore, when the output signal on terminal 24 of matrix 14 is of a polarity opposite to that of the signal on input terminal 12, AND gate 20 produces an output signal on output terminal 28 of AND gate 20.

If matrix 14 combines the input signal on input terminal 10 with a signal corresponding to an inversion of the signal on input terminal 12 and of twice the magnitude, AND gate 20 produces an output when the input signal on input terminal 10 is at least twice as great in amplitude as the input signal on input terminal 12 due to the face that output terminal 28 of AND gate 20 is an inverting output. However, it is understood that AND gate 20 could be replaced by an AND gate having no inverting terminals in order to produce the same result. Similarly, other variations within the spirit of these teachings will appear to those skilled in the art.

Figure 2:
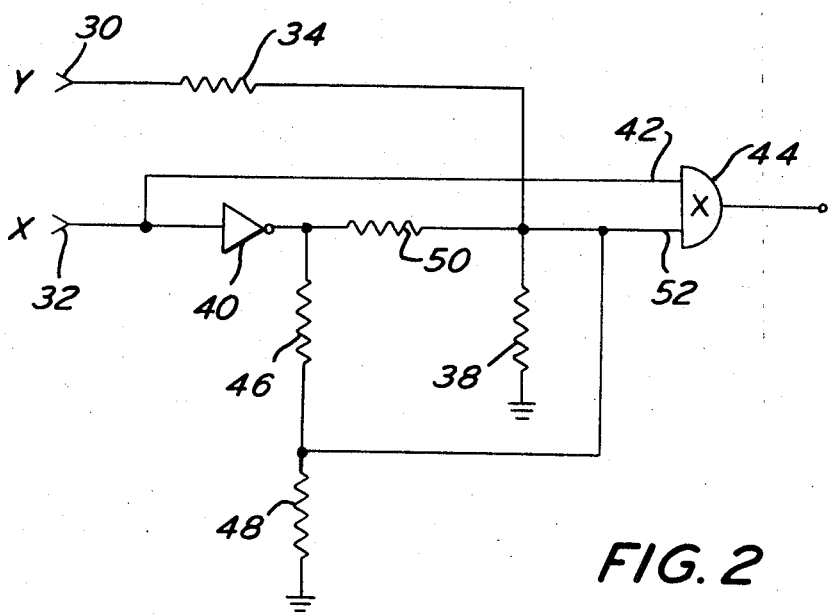
FIG. 2 is a schematic diagram of an embodiment of an apparatus in accordance with the present invention.

Referring now to FIG. 2, there is shown an embodiment of the invention which detects the condition that input signal Y on input terminal 30 is greater in amplitude than twice input signal X on input terminal 32. Input signal Y is applied across resistors 34 and 38. A signal Y' is developed across resistor 38. Input signal X on input terminal 32 is applied through resistor 35 to input terminal 42 of AND gate 44. Input signal X is also applied through inverter means 40 to a resistor matrix made up of resistors 46, 48, 50 and 38. The signal of minus X' is developed across resistor 38 and also across resistor 48. Therefore, the signal on input 52 of AND gate 44 is equal to Y' minus 2X'. AND gate 44 therefore produces an output signal only when input signal Y is in excess of two times input signal X.

Although a detailed structural embodiment has been disclosed, it will be obvious to those skilled in the art that various modifications may be made to the structure and operation of the invention within the spirit of these teachings. For example, various other types of gating circuitry may be used to perform the same function or to achieve the same results in a different manner. Also, various types of matrices may be used to combine the signals of relative amplitude. Although a particular embodiment has been disclosed which detects the magnitude of one signal being at least twice as great as the magnitude of a second signal, it is obvious that any particular relative amplitude relationship may be chosen by suitable choice of resistance values in the matrix.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for generating a signal in response to a predetermined relative amplitude difference between a first signal on a first channel and a second signal on a second channel, comprising:

means for inverting one of said first and second signals to produce an inverted signal;

means for algebraically matrixing said inverted signal and the other of said first and second signals which was not inverted to produce a third signal; and gating means responsive to a predetermined polarity relationship between said third signal and said one of said first and second signals for producing an output signal.

2. Apparatus as recited in claim 1 wherein said inverting means comprises an inverting amplifier.

3. Apparatus according to claim 1 wherein said matrix means comprises a resistance network.

4. Apparatus as recited in claim 1 wherein said gating means is an AND gate.

5. Apparatus for generating a signal in response to a predetermined relative amplitude difference between a first signal on a first channel and a second signal on a second channel, comprising:

means for inverting said second signal on said second channel to produce an inverted second signal;

means for matrixing said first signal with said inverted second signal to produce a third signal equal to the algebraic sum of said first signal and said inverted second signal multiplied by a predetermined number; and gating means provided with a first and a second input and an output, said third signal being applied to said first input of said gating means and said second signal being applied to said second input of said gating means, said gating means producing an output signal on said output of said gating means in response to a predetermined polarity relationship between said second and third signals.

6. Apparatus as recited in claim 5 wherein said inverting means comprises an inverting output.

7. Apparatus as recited in claim 5 wherein said matrixing means comprises a resistance network.

8. Apparatus as recited in claim 5 wherein said gating means comprises an AND gate.

* * * * *